April 25, 1933.  R. H. KRAFT  1,905,472
LOADING MACHINE
Original Filed Nov. 16, 1929  3 Sheets-Sheet 1
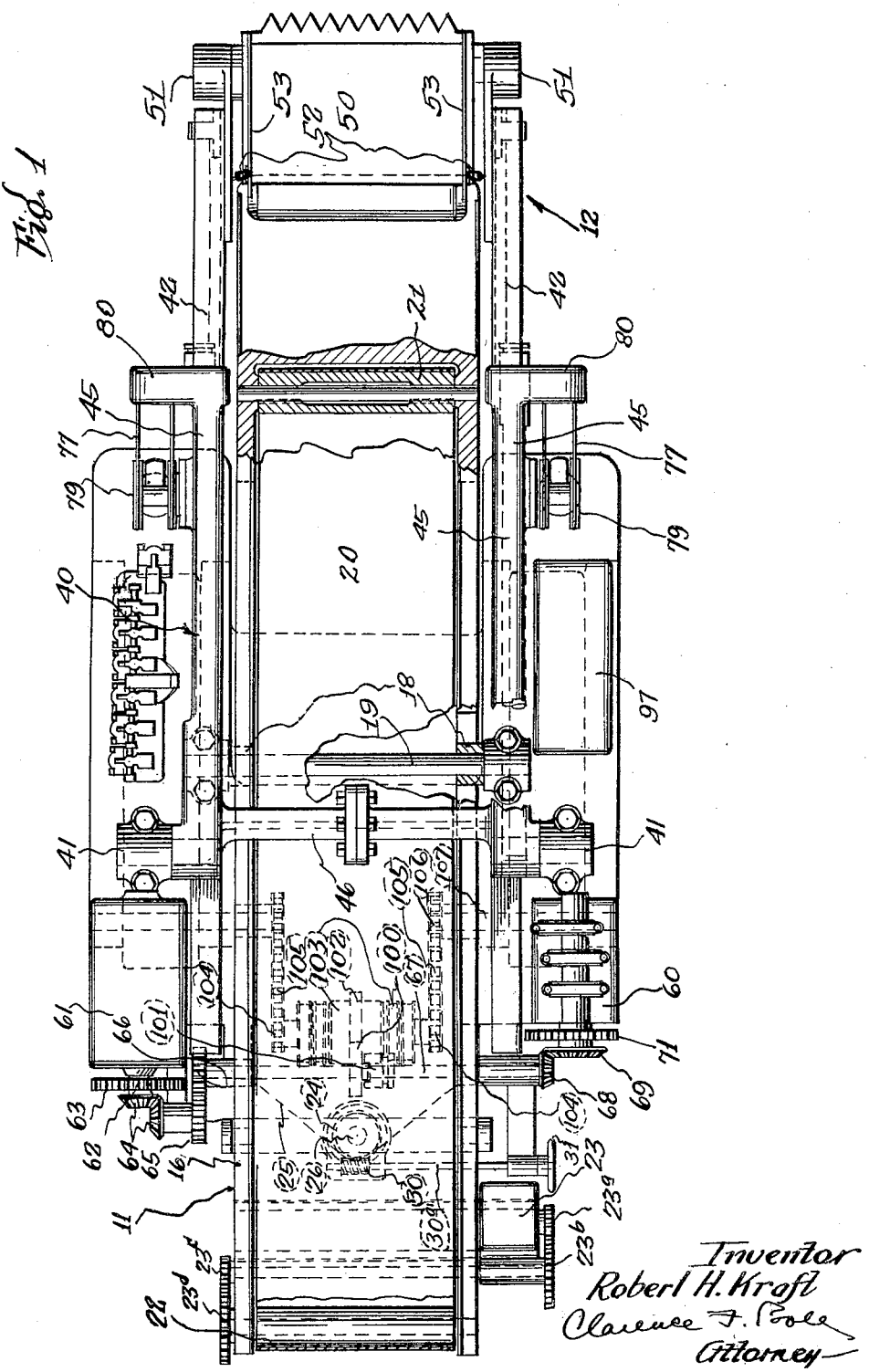
Inventor
Robert H. Kraft
Clarence F. Poole
Attorney April 25, 1933.   R. H. KRAFT   1,905,472
LOADING MACHINE
Original Filed Nov. 16, 1929   3 Sheets-Sheet 2
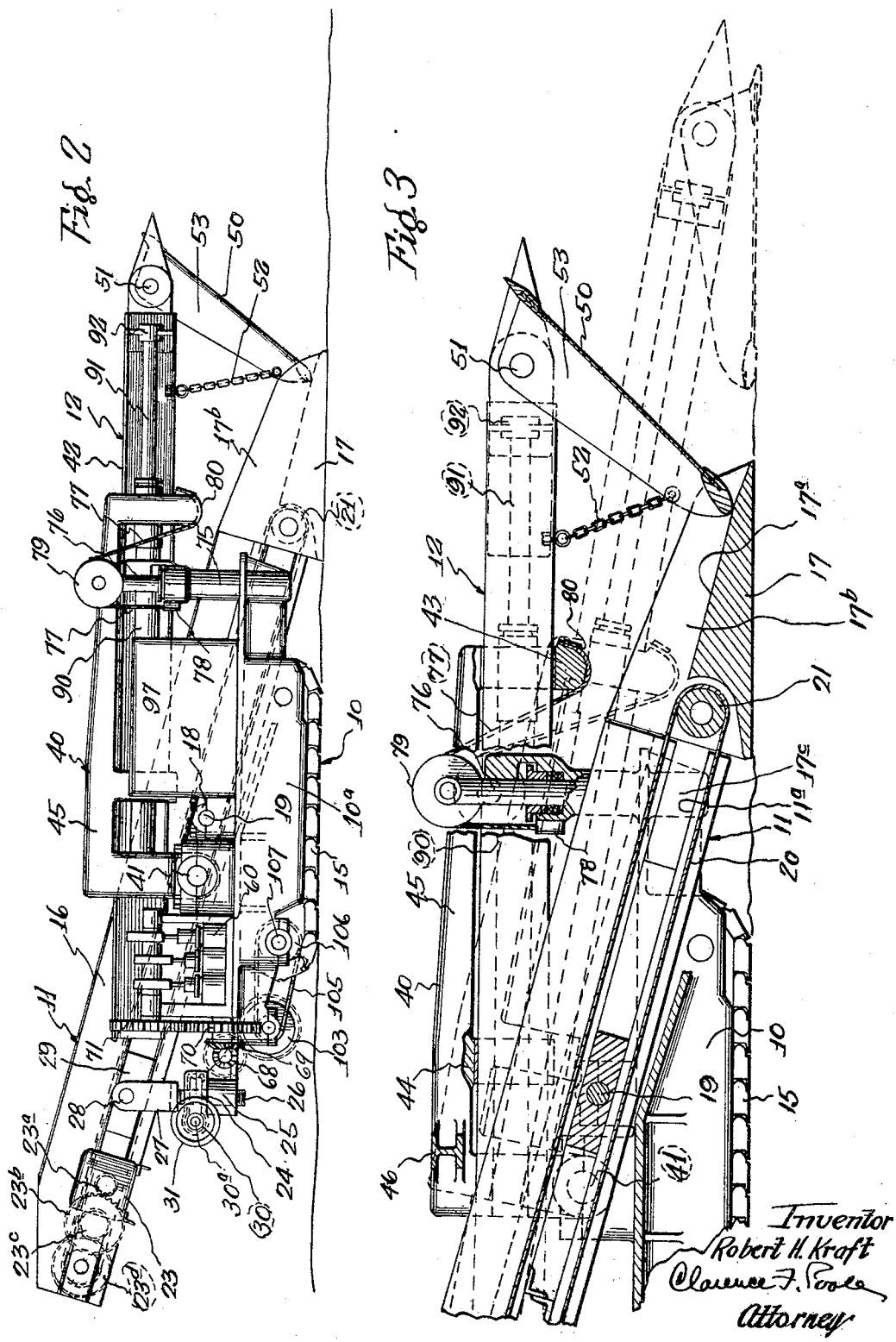

April 25, 1933.  R. H. KRAFT  1,905,472
LOADING MACHINE
Original Filed Nov. 16, 1929   3 Sheets-Sheet 3
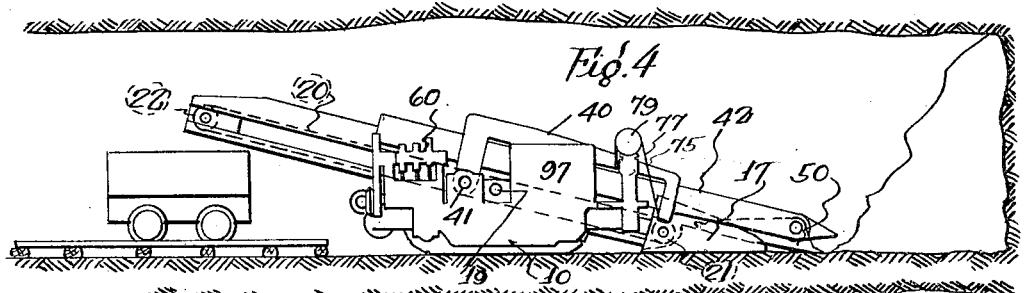
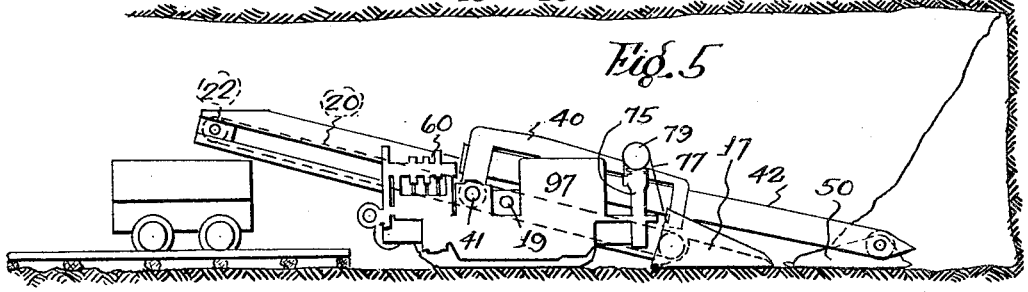
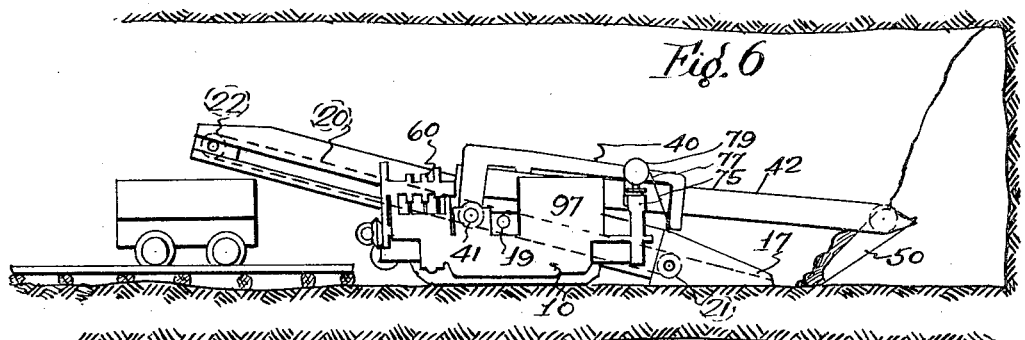
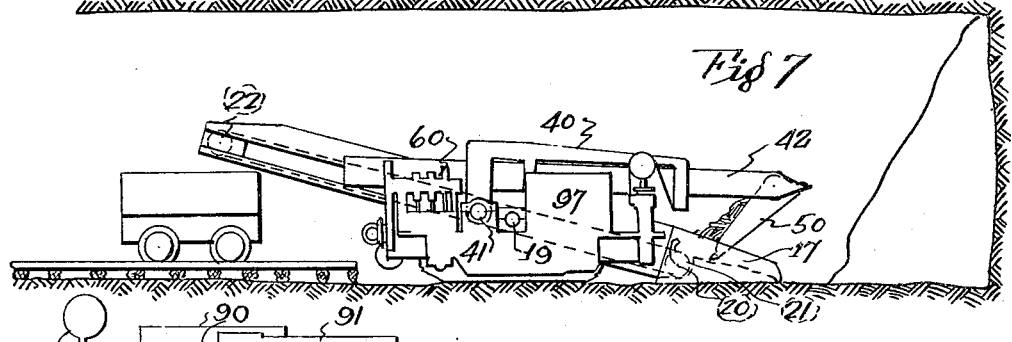
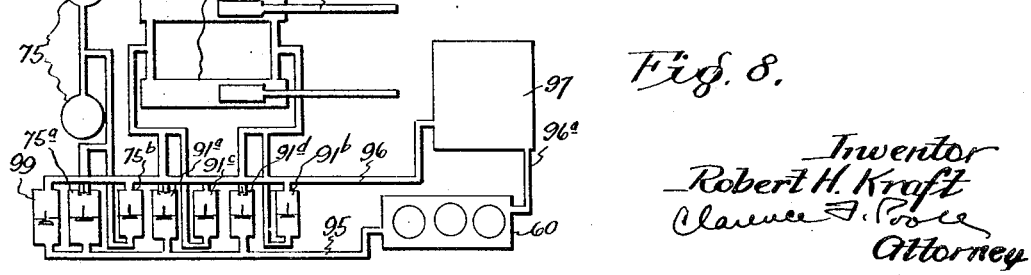
Inventor
Robert H. Kraft
Clarence F. Poole
Attorney Patented Apr. 25, 1933

1,905,472

UNITED STATES PATENT OFFICE

ROBERT H. KRAFT, OF CHICAGO, ILLINOIS, ASSIGNOR TO GOODMAN MANUFACTURING COMPANY, OF CHICAGO, ILLINOIS, A CORPORATION OF ILLINOIS

LOADING MACHINE

Application filed November 16, 1929, Serial No. 407,593. Renewed June 13, 1932.

This invention relates to improvements in loading machines, and has for its principal object to provide an improved form of gathering mechanism for such machines, of the type adapted to be positively advanced into the pile of loose material so as to penetrate the same, either at the ground floor level or in positions above the same, so as to dislodge the material and thereafter draw it toward and load it upon the conveyor.

More specifically, my invention relates to an improved form of loading mechanism wherein the loading element itself consists of a pan-like structure pivotally supported at its outer end upon a thrusting element consisting of a pair of spaced beams which are both extensible forwardly of the machine, and which are mounted both for reciprocable movement and for vertical lifting movement in positions forwardly of the machine.

With the construction above described, the gathering element or pan may be thrust edgewise into the material by a forward movement of the beam so that the material drops upon the pan and then by reversing the movement of the beam and lifting the same the free, or inner, end of the pan drops downwardly into an inclined position so that the beam and pan together form in effect a hoe which sweeps the dislodged material toward the machine and discharges said material upon the conveyor.

In carrying out my invention I have shown a machine in which the main operating parts of the loading mechanism generally described above are hydraulically moved and controlled and the loading mechanism including the conveyor is mounted upon an endless tractor device so that loading is effected in an area directly in front of the machine. It will be understood, however, that the principal features of the invention relate to the loading mechanism per se, and that said loading mechanism is capable of being utilized with other transporting and conveying devices and also may be mounted to swing at various angles relative to the main frame so as to be more flexible in operation.

This invention may be best understood by reference to the accompanying drawings, wherein:

Figure 1 is a plan view of a machine constructed in accordance with my invention with certain parts omitted or broken away to show details of the construction thereof;

Figure 2 is a side view of the machine shown in Figure 1;

Figure 3 is an enlarged fragmentary side view of the machine shown in Figure 1, with certain of the operating parts shown in section;

Figures 4, 5, 6 and 7 are diagrammatic side views of the machine shown in the various positions during its normal cycle of operation; and Figure 8 is a piping diagram of the hydraulic operating and controlling system.

Referring now to the details shown in the drawings, the main elements of the machine herein disclosed comprise a base frame 10, a conveyor 11, and a loading element 12. In the form shown in the drawings, the base frame 10 includes a main frame member 10a having suitable means for transporting the machine about the mine floor; as, for instance, a pair of endless tread devices 15, 15, provided with suitable driving means as will hereinafter more fully appear.

The conveyor 11 is mounted to extend longitudinally of the main frame member 10a, and comprises a chute like frame 16 having a front apron or plate 17 adapted to engage the ground. Said conveyor frame is preferably mounted on the base so that the apron 17 may be raised from the ground during transportation of the device, in the form shown, the entire conveyor frame being pivotally supported by means of a bearing 18 journaled on a shaft 19 fixed on and extending across the center portion of the main frame member 10a. A movable conveyor device of any suitable form is carried by the conveyor frame 16, in the form shown said conveyor device comprising an endless belt 20 trained at the forward end about a roller 21 journaled in the end plate 17 and at the rear end about a roller 22.

Suitable means may be provided for controlling the pivotal or rocking movement of the conveyor 11 as by means of a worm gear 24 mounted on a bracket 25 at the rear end of the main frame and engaged with a threaded shaft 26 connected to a support member 27 which in turn is pivotally connected at 28 to blocks 29—29 slidably mounted longitudinally of opposite sides of the conveyor frame 16. The worm gear may be operated in any suitable manner as by means of a worm 30 on shaft 30a, which shaft may be controlled by means of a hand wheel 31.

The endless conveyor belt 20 may be suitably driven as by a motor 23 mounted near the rear end of the conveyor frame 16 and connected to the roller 22 through a pinion 23a and reduction gears 23b, 23c and 23d. The front apron 17 preferably consists of a shovel shaped member with a downwardly inclined face 17a extending from a point closely adjacent the front end of the endless conveyor belt 20 and arranged so that material can be easily moved upwardly along said inclined face 17a and onto said conveyor belt as shown in Fig. 3. Upright sides 17b, 17b may be provided to confine the material while being moved or pushed on to the conveyor in the manner shown in Fig. 7. It will be seen that the entire apron member 17 consists of an integral casting which is detachably connectible to the frame 16 of the conveyor by means of rearwardly projecting extensions 17c which fit within suitable guides 11a formed in the front end of said conveyor frame. With this construction the apron 17 can be readily detached for replacement or repair, or in case it is desirable to increase the space under said apron when transporting the machine from place to place.

The loading element consists of a cradle 40 pivotally mounted on trunnions 41, 41 carried by the main frame member 10a, and having a pair of beams 42, 42 slidably mounted therein so as to be reciprocated in a direction extending longitudinally of the machine. In the forms shown, said beams are supported for sliding movement in guides 43 and 44 near the front and rear ends of side members 45—45 forming part of said cradle. Said members 45—45 extend along the sides of the conveyor and are connected together by a cross piece 46.

A loading pan 50 is pivotally connected at 51 between the forward ends of the beams 42—42. Said loading pan is relatively flat throughout its length, and arranged to be supported in a pendant position when the beams 42—42 are elevated, as shown in Figures 2 and 3, but is provided with suitable means for limiting its downward swinging movement to an angle somewhat less than 90 degrees with respect to the beams 42; as, for instance, by means of chains 52—52 connected between each of the beams 42 and side portions 53 of said pan. The arrangement is such, however, that the free end of the pan may swing or fold rearwardly and upwardly toward the beam when the beam 42 is thrust forwardly, particularly when the entire loading mechanism including the cradle 40 and the beams 42 are inclined downwardly, so that the forward ends of the beams approach the ground, as indicated by dotted lines in Fig. 3. In this latter position it will be noted that the loading pan 50 may be brought to a position where it lies flatwise along the ground, and when thrust forwardly by the beam operating mechanism, material is loaded on the hinged end of said pan as indicated in Figures 4 and 5, then by moving the cradle and beams upwardly, and simultaneously telescoping said beams rearwardly in said cradle, the free end of the pan 50 is caused to drop by gravity and forms in effect a hoe, which drags the material on the pan toward the machine and thence upwardly along the apron 17 to the endless belt 20 of the conveyor 11, as shown in Figures 6 and 7.

The means shown herein for operating the cradle and beams consist of a hydraulic transmission device operated by means of a pressure pump 60. In the form shown, said pump is mounted on one side of the main frame and is driven by a motor 61 through suitable gearing including a motor pinion 62, spur gear 63, mitre gears 64, spur gears 65 and 66, shaft 67, bevel pinion 68 and bevel gear 69 and a spur gear 70, meshed with a pump gear 71.

The hydraulic means for elevating the cradle comprises a pair of cylinders 75—75 mounted on the main frame at opposite sides of the conveyor frame and having pistons 76—76 therein adapted to be operated by hydraulic pressure in the cylinder in the usual manner. The pistons 76—76 are connected to the cradle through flexible cables 77—77 which have one end fixed at 78 to the cylinder 75 and are led upwardly above sheaves 79 mounted on the upper end of the pistons 76 and thence downwardly to a connecting bracket 80 carried at the front end cradle side member 45.

The forward and rearward thrust of the beams 42 are also hydraulically operated by means of cylinders 90—90, one of which is mounted on the inner side of each of the side members 45 and each having a piston rod 91 therein connected to the beams 42 at 92. The hydraulic system for controlling and operating the elevating mechanisms is diagrammatically illustrated in Figure 8. As will be seen from this figure, the pump 60 is connected to a high pressure line 95 and a low pressure line 96, the latter line being connected to a tank 97 which forms a return reservoir from said low pressure line and in turn is connected to the inlet of the pump by a pipe 96a.

The elevating pistons 76—76 in the cylinders 75—75 are operated to raise the cradle by opening a valve 75a connected to the high pressure line 95 while pressure may be released in said pistons to permit the cradle to lower by gravity when the valve 75a is closed and a relief valve 75b is open.

Forward thrust of the piston rods 91 is accomplished by opening an inlet valve 91a and a valve 91b while the reverse or retractive movement of the piston rod 91 is produced by opening of a relief valve 91c and a valve 91d. A bypass valve 99 is also provided between the high pressure line 95 and the low pressure line 96 so as to control the amount of pressure desired at any one of the several operations above described.

Power means for the tractor tread devices 15—15 comprise a spur gear 100 selectively connectible to the driving shaft 67 extending across the rear end of the main frame, as by means of a clutch 101. The gear 100 is meshed with a gear 102 which may form the center driving element of a pair of gear reduction members 103—103 of any well known form, in turn connected by sprockets 104—104 to drive chains 105 extending forwardly to sprockets 106 on shafts 107, which carry the drive sprockets for the endless tread devices 15—15 fixed thereon.

The use and operation of a machine constructed as above described will now be manifest. As shown in Figure 4, the machine is particularly adapted for use in gathering loose material, by attacking the base of the pile of material. In carrying out this operation the machine is moved to a point where the front of the apron 17 is closely adjacent the base of the pile. The thrust beams 42—42 are moved into a retracted or rearward position in the cradle 40. The cradle 40 and beams 42, 42 are tipped downwardly so that the front ends of the beams are close to the ground, with the pan 50 in collapsed position between the beams and the apron 17. The beams 42—42 are then thrust forwardly directly along the ground into the pile of loose material so as to cause the pan 50 to be pushed into the pile of said material in a horizontal position, it being especially noted that the hinged edge of the pan forms the leading or digging edge of the loading device during this operation. A portion of the loose material is thus deposited upon the pan in position to be withdrawn and loaded upon the machine.

The withdrawing operation consists of a combined retraction of the beams 42 and elevation of said beams, which, of course, is under the complete control of the operator and may be carried on simultaneously or successively, depending upon the character of the loose material being handled. The size of the load, or other factors change the method of loading; as, for instance, it may be desirous to lift the beams 42, as shown in Figure 6, before any retractive movement of the beams is commenced. This is ordinarily practical unless there is a relatively large load upon the pan, in which case, the pan may be partially withdrawn before the beams are elevated. It will be noted, however, as soon as the pan is fairly clear of the pile of loose material the beam can be raised to such a height as is indicated in Figures 2 and 3 so as to drag the material upwardly along the inclined face 17a of the apron 17 where it is deposited upon the endless belt 20 of the conveyor 11, as indicated in Figure 7.

Although I have have herein shown and described one form in which my invention may be embodied, it will be understood that the construction thereof and arrangement of the various parts may be altered without departing from the spirit and scope thereof. Furthermore, I do not wish to be construed as limiting myself to the specific embodiment illustrated in the drawings, excepting as it may be limited by the appended claims.

I claim as my invention:

1. In a loading machine, a base, a conveyor adapted to engage the ground at the front of said base, an extensible thrust member pivotally mounted on said base on an axis extending transversely of said conveyor, a loading pan pivotally connected on the forward end of said thrust member and having its swinging end collapsible toward the rear end of said thrust member, when the latter is moved forwardly and means limiting the downward swinging movement of said loading pan when said thrust member is moved rearwardly.

2. In a loading machine, a base, a conveyor adapted to engage the ground at the front of said base, and a means cooperating with said conveyor to move material rearwardly toward and upon said conveyor comprising an extensible beam vertically movable in a plurality of angular or horizontal positions and having a loading pan pivotally connected on a transverse axis at the front end thereof, said loading pan being arranged to be movable forwardly by said beam in a position substantially parallel with the ground, and being movable rearwardly along the ground at an obtuse angle with respect thereto.

3. In a loading machine, a base, a thrust member mounted for vertical rocking movement, power means for moving said thrust member in various angular positions relative to said base, power means for reciprocating said thrust member beyond said base and adjacent the ground, a loading element hinged adjacent its forward edge to the front end of said thrust member and having the major portion of its area disposed rearwardly of its hinged joint and a rearward end adapted to slide along the bottom upon rearward movement of said thrust member and means limiting the forward and downward swinging movement of said loading element relative to said thrust member.

4. In a loading machine a base, a thrust member mounted for vertical rocking movement relative to said base, power means for reciprocating said thrust member beyond said base adjacent the ground, and a loading element hinged adjacent one edge on said thrust member, and arranged to be thrust forwardly on a generally horizontal plane with its hinged edge leading, and the remaining portion of said loading element in trailing position, but movable into a relatively upright position during retractive movement of said thrust member.

5. In a loading machine, a base, a cradle carried on said base for rocking movement with respect thereto about a horizontal transverse axis, a thrust member carried in said cradle for reciprocable movement with respect thereto comprising a beam, power means for rocking said cradle and reciprocating said thrust member, a loading pan pivotally connected to the forward end of said beam and having a swinging end collapsible toward the rear of said beam upon forward movement thereof, and open with respect to said beam upon rearward movement thereof.

6. In a loading machine, a base, a cradle carried on said base for rocking movement with respect thereto about a horizontal transverse axis, a thrust member carried in said cradle for reciprocable movement with respect thereto comprising a beam, power means for rocking said cradle and reciprocating said thrust member, a loading pan pivotally connected to the forward end of said beam and having a swinging end collapsible toward the rear of said beam upon forward movement thereof, and open with respect to said beam upon rearward and upward movement thereof, and means for limiting the downward swinging movement of said loading pan when said thrust member is moved rearwardly and upwardly with respect to said base.

7. In a loading machine, a base, a thrust member mounted for relative rocking movement with respect to said base, means for reciprocating said thrust member towards and away from said base, and loading means carried adjacent one end of said thrust member comprising a loading pan pivotally connected to the forward end of said thrust member having a forward edge adapted to slide along the ground and engage a pile of loose material adjacent the ground upon forward movement of said thrust member, and having a rearward edge adapted to slide along the ground at an obtuse angle with respect to a top surface of a horizontal portion of said base upon rearward movement of said thrust member for moving loose material toward said base.

8. In a loading machine, a base, a conveyor adapted to engage the ground at the front of said base, a thrust member mounted for relative rocking movement with respect to said base, means for reciprocating said thrust member towards and away from said base, and means carried by said thrust member for loading material onto said conveyor comprising a loading pan pivotally connected to the forward end of said thrust member having a forward edge adapted to slide along the ground and engage a pile of loose material adjacent the ground upon forward movement thereof, and having a rearward edge adapted to slide along the ground at an obtuse angle with respect to the top surface of a horizontal portion of said base upon rearward movement of said thrust member for moving loose material onto said conveyor.

9. In a loading machine, a base, a conveyor adapted to engage the ground at the front of said base, a cradle carried on said base for rocking movement with respect thereto about an axis extending transversely of said conveyor, a thrust member carried in said cradle for reciprocable movement with respect thereto comprising a beam, power means for rocking said cradle and reciprocating said thrust member, and means carried by said beam for loading material onto said conveyor comprising a loading pan pivotally connected to the forward end of said beam having a forward end adapted to slide along the ground and engage a pile of loose material adjacent the ground and having a rearward end adapted to slide along the ground upon rearward movement of said beam and move said loose material onto said conveyor.

10. In a loading machine, a base, an inclined conveyor adapted to engage the ground at the front of said base, and means cooperating with said inclined conveyor to move material rearwardly toward and upon said conveyor comprising an extensible beam movable in a plurality of angular and horizontal positions and having a loading pan pivotally connected on a transverse axis at the front end thereof, said loading pan being arranged to be movable forwardly by said beam in a position substantially parallel with the ground to engage a pile of loose material adjacent the ground and being movable rearwardly along the ground at an obtuse angle with respect to the ground rearward of said loading pan to move said loose material onto said inclined conveyor.

Signed at Chicago, in the county of Cook and State of Illinois this 14th day of November, 1929.

ROBERT H. KRAFT.